May 15, 1951          C. S. ASH          2,553,161
VEHICLE WHEEL
Filed March 29, 1946          2 Sheets-Sheet 1
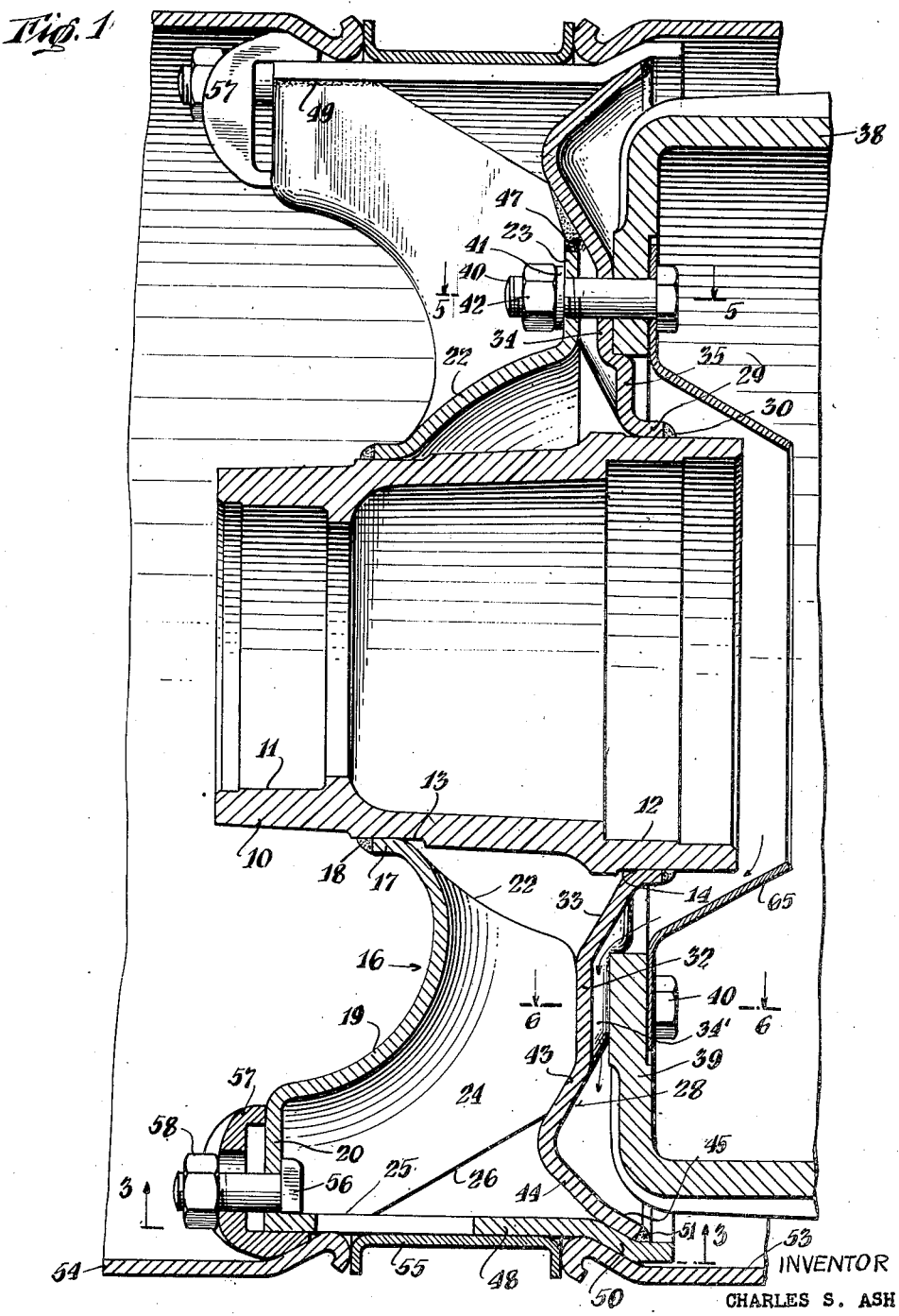
INVENTOR
CHARLES S. ASH
BY
ATTORNEYS May 15, 1951  C. S. ASH  2,553,161
VEHICLE WHEEL
Filed March 29, 1946  2 Sheets-Sheet 2
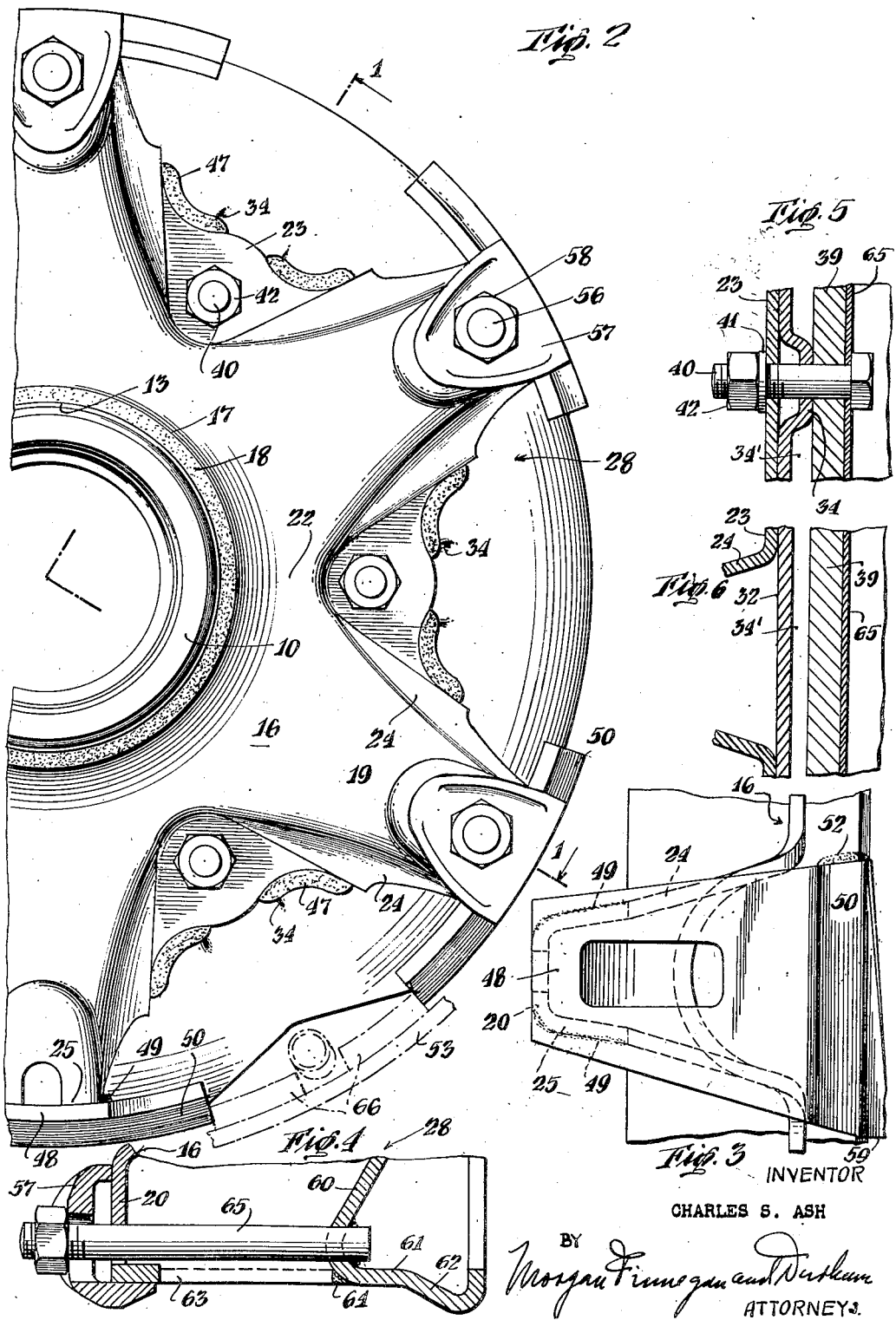
INVENTOR
CHARLES S. ASH
BY Morgan Finnegan and Durham
ATTORNEYS.

Patented May 15, 1951

2,553,161

UNITED STATES PATENT OFFICE 2,553,161

VEHICLE WHEEL

Charles S. Ash, Milford, Mich.

Application March 29, 1946, Serial No. 658,110

13 Claims. (Cl. 301—6)

1

The present invention relates to a vehicle wheel and more particularly to a vehicle wheel for carrying a plurality of demountably mounted road engaging elements.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a cross sectional view of a typical and illustrative embodiment of the vehicle wheel of the present invention, the section being taken along line 1—1 of Fig. 2;

Fig. 2 is an elevational view of the wheel as seen from the outer side of the wheel looking inwardly;

Fig. 3 is a fragmentary plan view taken along line 3—3 of Fig. 1;

Fig. 4 is a fragmentary cross-sectional view of a modified embodiment of the invention;

Fig. 5 is a fragmentary cross-sectional view of the first embodiment taken along line 5—5 of Fig. 1; and Fig. 6 is another fragmentary cross-sectional view of the first embodiment taken along line 6—6 of Fig. 1.

The present invention has for an object the provision of a vehicle wheel on which dual tires may be demountably mounted. Another object is the provision of a wheel of the type just mentioned on which the tires are demountable at the rim, and pneumatic tire rims of a standard construction may be used if desired. The invention further provides a dual tire wheel which is of sturdy construction capable of heavy duty uses such as, for instance, on trucks, busses, etc., and is at the same time of simple design and economical to fabricate from the standpoint both of material and labor. Still another object of the invention is the provision of a vehicle wheel having the advantages already mentioned which has combined therewith suitable braking means for the wheel.

Referring now in detail to the illustrative em-

2 bodiments of the invention shown by way of example in the accompanying drawings, and referring first to the embodiment shown in Figs. 1 to 3 inclusive, the vehicle wheel comprises a tubular hub member 10 which is preferably cast and internally finished at 11 and 12 for the reception of suitable anti-friction bearings (not shown) whereby the wheel may be mounted for free rotation upon a vehicle axle end. The cast tubular hub member 10 is likewise externally finished to provide cylindrical surfaces or seats 13 and 14 each to receive a pressed web member which members are fashioned to demountably support pneumatic tire carrying rims.

As shown, the outer web member designated generally by numeral 16 is pressed from a single blank of material and comprises an axially outwardly turned cylindrical portion 17 at its inner periphery which seats on cylindrical surface 13 of hub 10 and is securely welded thereto by a circular weld 18. Web 16 is further formed with a plurality (six in the illustrative embodiment shown) of outwardly axially smoothly curved portions 19 which extend radially from the hub and are spaced from each other about the body of the web, as clearly shown in Fig. 2. Each of the curved portions 19 terminates in a flat portion 20 at its outer radial end, and the portions 20 are formed to be in a plane substantially normal to the axis of hub member 10 and intersecting the seat 11 for the outer bearing of the hub. The web portions 19 and 20 form integral spoke portions of the vehicle wheel for demountably supporting the axially outer tire rim.

As shown, web member 16 between curved portions 19 is oppositely, that is, axially inwardly, turned or curved at portions 22 and these portions terminate radially outwardly in flat portions 23 formed to lie in a plane normal to the axis of hub 10. Each of the spoke portions 19—20 of the outer web is provided with integral strengthening webs 24 which extend axially inwardly from each edge of the portions 19 and 20, having top edges 25 substantially parallel to the axis of the hub and inclined edges 26 merging with the curved periphery of flat portions 23 of the web.

An inner web member for the assembled vehicle wheel is designated generally by the numeral 28 and comprises a pressed single piece of material formed at its inner periphery with an axially inwardly turned cylindrical portion 29 which is seated on surface 14 of hub 10 and securely welded thereto by a circular weld 30. As shown, the web 28 is formed with a central body portion 32 which is flat and lies in a plane substantially normal to the axis of the hub, and between the spoke portions 19—20 the flat portion 32 abuts flat portion 23 of the outer web 16. Inclined web portions 33 radially inwardly of central body portions 32 integrally joins said body portion to the cylindrical portion 29 of the inner web. Substantially in the center of its areas between spokes 19—20, the central body portion 32 of the inner web is formed in axially inwardly offset flat portions 34, and these portions are integrally joined to cylindrical portion 29 through web portions 35, which extend in a substantially radial plane. A brake drum 38 which may be of a conventional type and having a flange 39 is secured to the inner web, the flange 39 seating against the finished inner faces of the spaced flat portions 34 of the web. Suitable apertures are provided through the drum flange 39 and the adjacent flat portions 23 and 34 of the outer and inner web respectively to accommodate a plurality of bolts 40 having lock washers 41 and cooperating nuts 42.

In the wheel and brake drum assembly so far described it will be apparent that the brake drum flange 39 and the inner web 28 of the wheel assembly are axially spaced apart throughout the major extent of their adjacent surfaces, abutting only at axially offset portions 34 of the web which form seats for the drum flange, this condition being clearly shown in Figs. 5 and 6 of the drawings. There are thus provided a plurality of roomy, arcuate channels, indicated in Fig. 1 by numeral 34', leading from the axially inner end of the wheel hub radially outwardly on the back of the wheel. The channels 34' provide escape paths for bearing lubricant from the inner end of hub 10, as indicated by arrows leading to and through the channels in Fig. 1, and a frusto-conical grease catcher 65 secured to flange 39 by bolts 40 is preferably employed to guide the lubricant into the channels. Excess lubricant from the inner end of the hub is thus controlled and disposed of before it can reach the brake mechanism where it would be troublesome.

The inner web 28 is further formed in an axially outwardly dished portion 43 into which flat portions 32 and 34 both merge, and portion 43 merges with an oppositely turned portion 44 which terminates in a frusto-conical portion 45 at the outer periphery of the web. The inner and outer webs are further securely joined by abutment between the curved upper edges of flat portions 23 and dished portions 43 where a curved weld 47 is made.

Means for demountably mounting dual rims on the wheel include plate members 48 which are shown in detail in Fig. 3 of the drawings. Plates 48 are curved to provide upper surfaces corresponding with the curvature of the tire rims and extend from the ends of spokes 19—20 of the outer web to the outer periphery of the inner web, their width increasing slightly giving them a wedge shape to provide a wide seat for the inner tire rim. Each plate 48 is seated on the upper edge of a flat web portion 20 and edges 25 of strengthening webs 24, being welded thereto as indicated at 49. The plates at their axially inner ends are inclined in portions 50 seating against frusto-conical portion 45 of the inner web and welded thereto at 51 and 52.

The inner rim 53 of the dual rim assembly is seated against inclined portions 50 of plates 48, the outer rim 54 is seated on the curved surfaces of the plates adjacent their opposite ends, and an annular spacing ring 55 is provided between the rims. Lug bolts 56 are provided one through each flat web portion 20 of the outer webs, and lugs 57 and nuts 58 demountably secure the rims in place on the wheel.

As best shown in Figs. 2 and 3 of the drawings, the plates 50 may be asymmetrically formed with circumferentially and axially extending edges 59 facingly positioned about the wheel to engage driving plates or lugs 66 riveted to the inner surface of rim 53 at three equally spaced positions thereon. The cooperatingly engageable lugs 66 and rear edges 59 of plates 50 serve to positively center the inner rim 53 at three places about the wheel as it is positioned against inclined faces 50, so that spacing ring 55 may be correctly aligned and assembled, as well as outer rim 54.

In the modified embodiment of the invention shown in Fig. 4 of the drawings the construction and assembly is closely similar to that described for the embodiment of Figs. 1 to 3 inclusive, except that the inner web 28 is formed with an outwardly dished portion 60 extending to the periphery of the web which merges with a cylindrical portion 61 flared at its axially inner end to provide an inclined surface 62 against which the inner rim may be seated. The plate members 63 of the embodiment of the invention are shorter, abutting cylindrical portion 61 and being welded thereto at 64. Elongated lug bolts 65 extend between portion 60 of the inner web and portions 20 of the outer web, further strengthening the composite wheel structure when the rims are assembled and held on the wheel.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a tubular hub, a pair of pressed webs welded to the hub in axially spaced apart relationship thereon, one of said webs having a radially and axially corrugated body providing spaced, radially and axially outwardly extending, separated, axially curved spoke portions and other, alternate, spaced portions radially centrally of said web axially offset from said spoke portions abutting the other web and secured thereto, the other web extending continuously radially outwardly from the hub and means for supporting a pair of tire rims on said webs, said means comprising a plate on the end of each spoke portion extending to the periphery of said other web and welded to said webs.

2. A vehicle wheel comprising, in combination, a tubular hub, a pair of pressed webs welded to the hub in axially spaced apart relationship thereon, one of said webs having a radially and axially corrugated body providing spaced, radially and axially outwardly extending, separated, axially curved spoke portions and other, alternate, spaced portions radially centrally of said web axially offset from said spoke portions abutting the other web and secured thereto, the other web extending continuously radially outwardly from the hub and means for supporting a pair of tire rims on said webs, said means comprising a plate on the end of each spoke portion extending to the periphery of said other web and welded to said webs, said plates having inclined and other surfaces for receiving tire rims.

3. A vehicle wheel comprising, in combination, a tubular hub, a pair of pressed webs welded to the hub in axially spaced apart relationship, one of said webs having a radially and axially corrugated body providing spaced, radially and axially outwardly extending, separated, axially curved spoke portions and other alternate, flat, spaced portions radially centrally of said web axially inwardly offset from said spoke portions, the other web extending continuously radially outwardly and having flat portions radially centrally thereof abutting said flat portions of said first web and secured thereto, and means for demountably mounting a pair of tire rims on said webs, one on said spoke portions and the other on the outer periphery of said other web.

4. A vehicle wheel comprising, in combination, a tubular hub, a pair of pressed webs secured to the hub, one of said webs having a corrugated body providing alternately positioned axially offset portions, certain of said portions forming radially and axially outwardly extending, separated, spokes and certain other of said portions being flat, the other of said webs also having a corrugated body radially centrally thereof providing flat portions axially offset from each other certain of said flat portions abutting the flat portions of said first web, a brake drum secured to the other flat portions of said second web, said other web extending continuously radially outwardly and means for mounting a pair of tire rims on said webs, one on said spokes and the other on the outer periphery of said other web.

5. A vehicle wheel comprising, in combination, a tubular hub, an inner pressed web secured to said hub and extending continuously radially outwardly therefrom, said web having radially centrally disposed flat portions, certain of which are axially offset from the other portions, a brake drum having a flange seated on certain of said flat portions, an outer radially and axially scalloped web secured to said hub said web having radially centrally disposed flat portions abutting the flat portions of said inner web not engaging the brake drum flange, said outer web having separated spoke portions, extending radially and axially outwardly and axially outwardly curving from and alternately spaced with respect to said flat portions of said outer web, and means for removably mounting a pair of tire rims on said webs, one on said spoke portions and one on the periphery of said inner web.

6. A vehicle wheel comprising, in combination, a tubular hub, an outer pressed web secured to said hub having radially and axially outwardly extending, separated, axially outwardly curved spoke portions having flat axially outer ends forming seats for rim lugs, said outer web also having axially inwardly curved portions between said spoke portions terminating in flat portions providing flat surfaces radially centrally disposed of said outer web, an inner pressed web continuously radially extending having radially centrally disposed flat portions abutting said surfaces and having a frusto-conical peripheral portion, and means for mounting a pair of tire rims on said webs, said means including a plate on the end of each spoke portion secured thereto and extending toward the inner web, each plate having an inclined inner end seated on said frusto-conical portion of said inner web and secured thereto.

7. A vehicle wheel comprising, in combination, an outer web secured to said hub having axially outwardly inclined spoke portions having flat axially outer ends forming seats for rim lugs, said outer web also having axially inwardly inclined portions between said spoke portions terminating in flat portions providing flat surfaces radially centrally disposed of said outer web, an inner web having radially centrally disposed flat portions abutting said surfaces and having a cylindrical portion adjacent the periphery flared at its axially inner end providing a frusto-conical edge, and means for demountably mounting a pair of tire rims on said webs, said means including a plate on the end of each spoke portion secured thereto and extending toward the inner web abutting said cylindrical portion and secured thereto.

8. A vehicle wheel comprising, in combination, a tubular hub, an inner web secured to said hub said web having radially centrally disposed flat portions certain of which are axially offset from the other portions, a brake drum having a flange seated on certain of said flat portions and otherwise entirely axially spaced from said inner web, means secured to said drum for deflecting lubricant from the inner end of said hub toward said flat portions of said inner web, and an outer web secured to said hub said web having radially centrally disposed flat portions abutting the flat portions of said inner web not engaging the brake drum flange, said outer web having spoke portions axially outwardly curving from and alternately spaced with respect to said flat portions of said outer web.

9. A vehicle wheel comprising, in combination, a tubular hub, a pair of webs secured to the hub in axially spaced apart relationship, one of said webs having a corrugated body providing spaced, axially curved spoke portions and other alternate, flat, spaced portions radially centrally of said web axially offset from said spoke portions, the other web having flat portions radially centrally thereof abutting said flat portions of said first web and secured thereto, a brake drum having a radially inwardly extending attaching flange secured to the inner web, means for spacing said flange and inner web apart to provide radially directed channels therebetween, and means secured to said drum for deflecting lubricant from the inner end of said hub toward said channels.

10. A vehicle wheel comprising, in combination, a tubular hub, a pair of webs secured to the hub in axially spaced apart relationship thereon, one of said webs having a corrugated body providing spaced, axially curved spoke portions and other, alternate, spaced portions radially centrally of said web axially offset from said spoke portions abutting the other web and secured thereto, and means for supporting a pair of tire rims on said webs, said means comprising a plate on the end of each spoke portion extending to the periphery of said other web and secured to said webs, said plates having radial surfaces at their axially inner ends to engage projections extending radially inwardly from one of the tire rims to be mounted thereon.

11. A vehicle wheel comprising, in combination, a tubular hub, a pair of pressed webs welded to the hub in axially spaced relationship, one of said webs being formed with a corrugated and peripherally scalloped body providing radially and axially extending separated spoke portions and other portions axially offset therefrom radially centrally of the body abutting the other web and welded thereto, the other of said webs extending continuously radially outwardly and having a reversely curved formation, and means for demountably mounting a pair of tire rims on said webs, one on said spoke portions and one on the other periphery of said other web.

12. A vehicle wheel comprising, in combination, a tubular hub, a pair of pressed webs welded to the hub in axially spaced relationship, one of said webs being formed with a corrugated and peripherally scalloped body providing radially and axially extending separated spoke portions and other portions axially offset therefrom radially centrally of the body abutting the other web and welded thereto, the other of said webs having flat portions radially centrally thereof abutting said first web and a reversely curved formation radially outwardly thereof, and means for demountably mounting a pair of tire rims on said webs.

13. A vehicle wheel comprising, in combination, a tubular hub, a pair of pressed webs having inner peripheral cylindrical portions welded to the hub in axially spaced relationship, the outer of said webs being formed with curved spoke portions curving from said hub and other axially offset portions oppositely curving from said hub, the other of said webs having portions radially centrally thereof abutting and secured to said other axially offset portions, and means for demountably mounting a pair of tire rims on said webs.

CHARLES S. ASH.

REFERENCES CITED

The following references are of record in the file of this patent:

UNITED STATES PATENTS

| Number | Name | Date |
| --- | --- | --- |
| 763,145 | Brennan | June 21, 1904 |
| 1,156,486 | Krebs | Oct. 12, 1915 |
| 1,486,173 | Williams | Mar. 11, 1924 |
| 1,539,572 | Jayne | May 26, 1925 |
| 1,791,033 | Klaus et al. | Feb. 3, 1931 |
| 1,860,001 | Vanderveer | May 24, 1932 |
| 1,928,897 | Kay | Oct. 3, 1933 |
| 2,261,637 | Ash | Nov. 4, 1941 |

FOREIGN PATENTS

| Number | Country | Date |
| --- | --- | --- |
| 13,252 | Great Britain | June 11, 1902 |
| 102,147 | Great Britain | Oct. 14, 1917 |